US012811881B2

(12) United States Patent
Huang et al.

(10) Patent No.: US 12,811,881 B2
(45) Date of Patent: Nov. 24, 2026

(54) NETWORK PROCESSOR USING FAKE PACKET GENERATION FOR IMPROVING PROCESSING EFFICIENCY OF LEARNING PACKETS AND ASSOCIATED PACKET PROCESSING METHOD

(71) Applicant: Airoha Technology (Suzhou) Limited, Suzhou City (CN)

(72) Inventors: Weihua Huang, Nanjing City (CN); Peng Du, Nanjing City (CN); Lidong Hu, Nanjing City (CN); Fei Yan, Nanjing City (CN)

(73) Assignee: Airoha Technology (Suzhou) Limited, Suzhou City (CN)

( * ) Notice: Subject to any disclaimer, the term of this patent is extended or adjusted under 35 U.S.C. 154(b) by 71 days.

(21) Appl. No.: 18/924,994

(22) Filed: Oct. 23, 2024

(65) Prior Publication Data

US 2025/0150392 A1 May 8, 2025

(30) Foreign Application Priority Data

Nov. 3, 2023 (WO) ................ PCT/CN2023/129654

(51) Int. Cl.
*H04L 45/74* (2022.01)

(52) U.S. Cl.
CPC .................................. *H04L 45/742* (2013.01)

(58) Field of Classification Search
CPC .................................................... H04L 45/742
See application file for complete search history.

(56) References Cited

U.S. PATENT DOCUMENTS

| | | | | |
|---|---|---|---|---|
| 2006/0168400 | A1 * | 7/2006 | Ronciak | H04L 49/90 711/E12.057 |
| 2017/0064048 | A1 | 3/2017 | Pettit | |
| 2019/0207783 | A1 | 7/2019 | Han | |
| 2023/0353485 | A1 | 11/2023 | Koponen | |

FOREIGN PATENT DOCUMENTS

| | | | |
|---|---|---|---|
| CN | 101019385 | A | 8/2007 |
| CN | 103347014 | A | 10/2013 |
| CN | 114450671 | A | 5/2022 |

OTHER PUBLICATIONS

NVIDIA Messaging Accelerator (VMA) Documentation Rev 9.8.60 (PDF copy).*
NVIDIA Messaging Accelerator VMA rev 952 (Year: 2023) (Web version).*
"International Search Report" mailed on Jul. 22, 2024 for International application No. PCT/CN2023/129654, International filing date: Nov. 3, 2023.

* cited by examiner

*Primary Examiner* — Bryan Y Lee
(74) *Attorney, Agent, or Firm* — Winston Hsu

(57) ABSTRACT

A network processor includes a processor. The processor includes at least one processor core and a cache. The at least one processor core loads and executes program codes to deal with packet processing. The program codes include a network driver, a network stack of an operating system (OS) kernel, and a packet pre-learning module. The packet pre-learning module generates a fake packet, and sends the fake packet to the network stack of the OS kernel through the network driver. The cache caches at least a portion of instructions and data associated with processing of the fake packet that is performed by the network stack of the OS kernel.

18 Claims, 3 Drawing Sheets

NETWORK PROCESSOR USING FAKE PACKET GENERATION FOR IMPROVING PROCESSING EFFICIENCY OF LEARNING PACKETS AND ASSOCIATED PACKET PROCESSING METHOD

BACKGROUND OF THE INVENTION

1. Field of the Invention

The present invention relates to a network processor design, and more particularly, to a network processor using fake packet generation for improving processing efficiency of learning packets and an associated packet processing method.

2. Description of the Prior Art

With the rapid development of Internet, there are more and more networking applications. Hence, the broadband gateways need to handle many kinds of packet processing via different types of networking technologies. One typical network processor design may employ a network accelerator that can offload packet processing of a central processing unit (CPU) in a hardware manner. For example, the network accelerator records a hardware forwarding table. When a packet received by the network processor matches one forwarding rule included in the hardware forwarding table, the packet is directly forwarded by the network accelerator without intervention of the CPU. However, when the packet received by the network processor does not match any forwarding rule included in the hardware forwarding table, the packet is sent to the CPU for further processing, and the hardware forwarding table recorded in the network accelerator is updated by the CPU. The packet that cannot be directly forwarded by the network accelerator may be regarded as a learning packet from CPU's perspective. Packet loss may occur after the CPU cache is occupied by lots of learning packets waiting to be processed by the CPU. Thus, there is a need for an innovative network processor design with improved processing efficiency of learning packets.

SUMMARY OF THE INVENTION

One of the objectives of the claimed invention is to provide a network processor using fake packet generation for improving processing efficiency of learning packets and an associated packet processing method.

According to a first aspect of the present invention, an exemplary network processor is disclosed. The exemplary network processor includes a processor. The processor includes at least one processor core and a cache. The at least one processor core is arranged to load and execute program codes to deal with packet processing. The program codes comprise a network driver, a network stack of an operating system (OS) kernel, and a packet pre-learning module. The packet pre-learning module is arranged to generate a fake packet, and send the fake packet to the network stack of the OS kernel through the network driver. The cache is arranged to cache at least a portion of instructions and data associated with processing of the fake packet that is performed by the network stack of the OS kernel.

According to a second aspect of the present invention, an exemplary packet processing method is disclosed. The exemplary packet processing method includes: executing a network driver; executing a network stack of an operating system (OS) kernel; generating a fake packet, and sending the fake packet to the network stack of the OS kernel through the network driver; and caching at least a portion of instructions and data associated with processing of the fake packet that is performed by the network stack of the OS kernel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
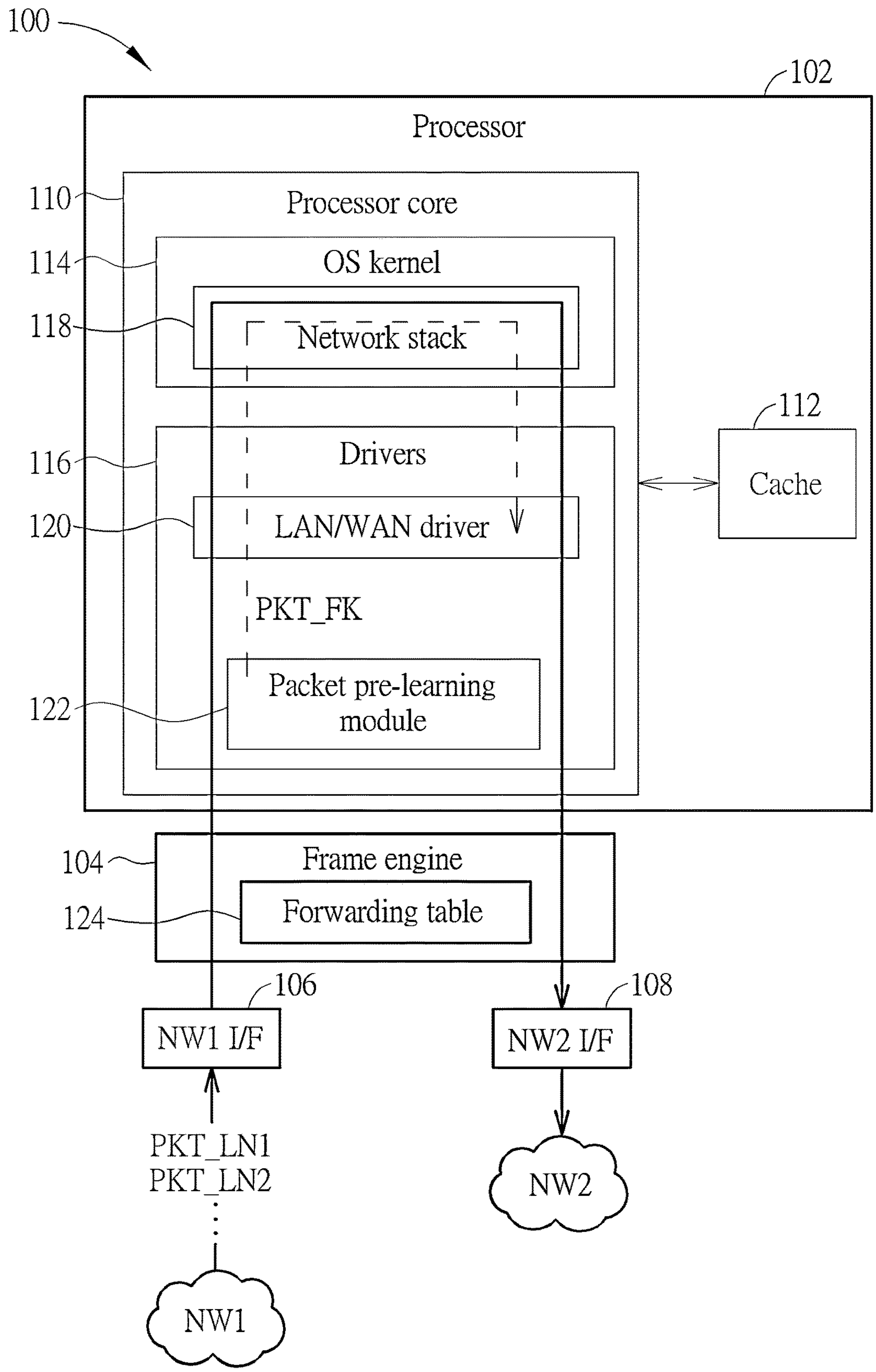
FIG. 1 is a diagram illustrating a network processor according to an embodiment of the present invention.

FIG. 1 is a diagram illustrating a network processor according to an embodiment of the present invention. By way of example, but not limitation, the network processor 100 may be implemented in a broadband gateway. In this embodiment, the network processor 100 includes a processor 102, a frame engine 104, and a plurality of network interfaces (labeled by "NW1 I/F" and "NW2 I/F") 106, 108. It should be noted that only the components pertinent to the present invention are illustrated in FIG. 1. In practice, the network processor 100 may include other components to achieve designated functions.

The network interface 106 is a hardware interface arranged to communicate with a first network NW1. The network interface 108 is a hardware interface arranged to communicate with a second network NW2. For example, one of the network interfaces 106 and 108 is a local area network (LAN) interface, and the other of the network interfaces 106 and 108 is a wide area network (WAN) interface.

The processor 102 is a host processor, and includes at least one processor core 110 and a cache 112. The processor 102 may be a single-core processor or a multi-core processor, depending upon actual design considerations. In one exemplary design, a single processor core may be represented by the processor core 110. In another exemplary design, multiple processor cores may be collectively represented by the processor core 110. The processor core 110 is arranged to load and execute program codes (i.e., software modules) to deal with packet processing. For example, the program codes may include a network stack 118 of an operating system (OS) kernel (e.g., a Linux kernel network stack) and a plurality of drivers 116, and the drivers 116 may include a network driver (e.g., a LAN/WAN driver 120) and a packet pre-learning module 122. The packet pre-learning module 122 is used for pre-learning (or pre-loading) of recently used instructions and data in the cache 112. This can reduce the processing time of a learning packet received from the network interface (e.g., LAN interface or WAN interface) 106 after a fake packet PKT_FK is generated from the packet pre-learning module 122.

The frame engine 104 is a network accelerator designed for hardware acceleration of the packet forwarding task, and includes a forwarding table 124. If a packet received by the network interface 106 has header information that matches a forwarding rule recorded in the forwarding table 124, the packet can be directly forwarded by the frame engine 104 according to the forwarding rule, without intervention of the processor 102. If a packet received by the network interface 106 has header information that does not match any forwarding rule recorded in the forwarding table 124, the packet is sent to the network stack 118 of the OS kernel 114 through the LAN/WAN driver 120 for further processing. Since a new forwarding rule can be learned from processing of the packet and then stored into the forwarding table 124 to facilitate forwarding of future packets received by the network interface 106, the packet not directly forwarded by the frame engine 104 may be regarded as a learning packet from processor's point of view. If the instructions and data needed for processing a packet received by the network interface 106 are available in the low-latency cache 112, the processor 102 does not need to retrieve the instructions and data from an external high-latency memory (which is large enough to store all instructions and data).

In this embodiment, the packet pre-learning module 122 is arranged to generate the fake packet PKT_FK that acts as a fake learning packet, and send the fake packet PKT_FK to the network stack 118 of the OS kernel 114 through the LAN/WAN driver 120. The cache 112 of the processor 102 is arranged to cache at least a portion (i.e., part or all) of instructions and data associated with processing of the fake packet PKT_FK that is performed by the network stack 118 of the OS kernel 114.

Suppose that the packet PKT_LN1 is received by the network interface (e.g., LAN interface or WAN interface) 106 before the fake packet PKT_FK is generated and sent to the network stack 118 of the OS kernel 114, and the packet PKT_LN2 is received by the network interface (e.g., LAN interface or WAN interface) 106 after the fake packet PKT_FK is generated and sent to the network stack 118 of the OS kernel 114. In one exemplary implementation, a configuration of the fake packet PKT_FK is based at least partly on the packet PKT_LN1. For example, the network interface 106 is a LAN interface and the network interface 108 is a WAN interface, each of the packets PKT_LN1 and PKT_LN2 is to be sent from a LAN side to a WAN side, and the fake packet PKT_FK is generated to simulate a packet to be sent from the LAN side to the WAN side. Fields in a header of the fake packet PKT_FK may include: destination medium access control (MAC) address=Customer Premise Equipment (CPE) LAN MAC (24:4b:fe:09:6b:c0), destination internet protocol (IP) address=WAN IP (192.168.50.10), source IP address=LAN IP (192.168.1.254), IP protocol type=UDP, and UDP data length=50. Suppose that the packet PKT_LN2 is a learning packet that is needed to be processed by the network stack 118 of the OS kernel 114. With a proper configuration of the fake packet PKT_FK which is sent to the network stack 118 before the packet PKT_LN2, a sequence of instructions invoked by the network stack 118 of the OS kernel 114 for processing the packet PKT_LN2 received by the network interface 106 may be identical to a sequence of instructions invoked by the network stack 118 of the OS kernel 114 for processing the fake packet PKT_FK generated by the packet pre-learning module 122. In this way, the packet processing efficiency of the packet PKT_LN2 can be improved due to the fact that the instructions required for processing the packet PKT_LN2 can be retrieved from the low-latency cache 112 without accessing the external high-latency memory such as a dynamic random access memory (DRAM). Further details of the packet pre-learning module 122 are described as below with reference to the accompanying drawings.

Figure 2:
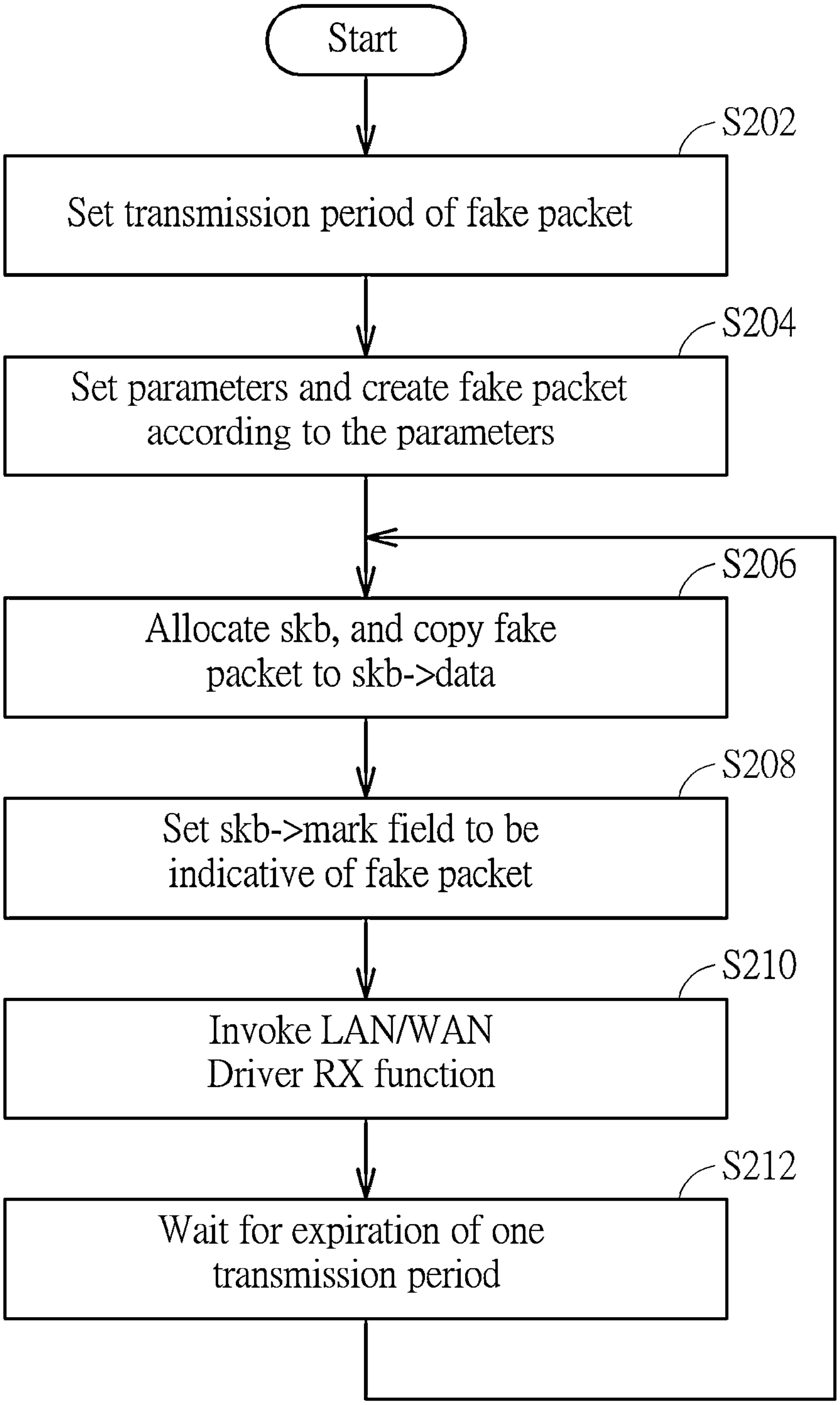
FIG. 2 is a flowchart illustrating a method of generating a fake packet according to an embodiment of the present invention.

FIG. 2 is a flowchart illustrating a method of generating the fake packet PKT_FK according to an embodiment of the present invention. The method may be performed by the processor 102 shown in FIG. 1. Provided that the result is substantially the same, the steps are not required to be executed in the exact order shown in FIG. 2. At step S202, the packet pre-learning module 122 sets a transmission period of the fake packet PKT_FK, where the transmission period may be within a range from 1 ms to 5 ms, and a default value of the transmission period may be 1 ms. In other words, the packet pre-learning module 122 generates the fake packet PKT_FK periodically. At step S204, the packet pre-learning module 122 sets parameters of the fake packet PKT_FK, and creates the fake packet PKT_FK according to the parameters. For example, the parameters may include a destination MAC address, a source IP address, a destination IP address, a protocol type (TCP or UDP), and a data length. At step S206, the packet pre-learning module 122 requests allocation of a socket buffer skb, and copies the fake packet PKT_FK to skb→data. The skb→data is a pointer that points to a start address of a data area in which a packet (e.g., fake packet PKT_FK) is stored. At step S208, the packet pre-learning module 122 sets the skb→mark field to be indicative of a fake packet. The skb→mark is a field that enables identifying a socket buffer by marking it. Hence, the skb→mark can be customized to mark specific information of a packet (e.g., fake packet PKT_FK) pushed into the socket buffer, and can be read later for dealing with certain processing of the packet (e.g., fake packet PKT_FK). At step S210, the packet pre-learning module 122 invokes a LAN/WAN Driver RX function for instructing the LAN/WAN driver 120 to receive and process the socket buffer skb. At step S212, the packet pre-learning module 122 waits for expiration of the transmission period (which is set at step S202). When the transmission period expires, the same generation process of the fake packet PKT_FK is repeated by the packet pre-learning module 122.

Since the fake packet PKT_FK is generated and sent to the network stack 118 of the OS kernel 114 periodically, the cache 112 can be ensured to hold frequently-used instructions and data of packet processing, including ip_rcv( ) ip_route_input_noref( ), ip_forward( ), dev_queue_xmit( ), skb(socket buffer) data structure, and associated skb operations such as skb_push( ), skb_pull( ), skb_reserve( ), skb_put( ), skb_clone( ), and skb_linearize( ). Since these instructions and the skb data structure are known to those skilled in the pertinent art, further description is omitted here for brevity.

Figure 3:
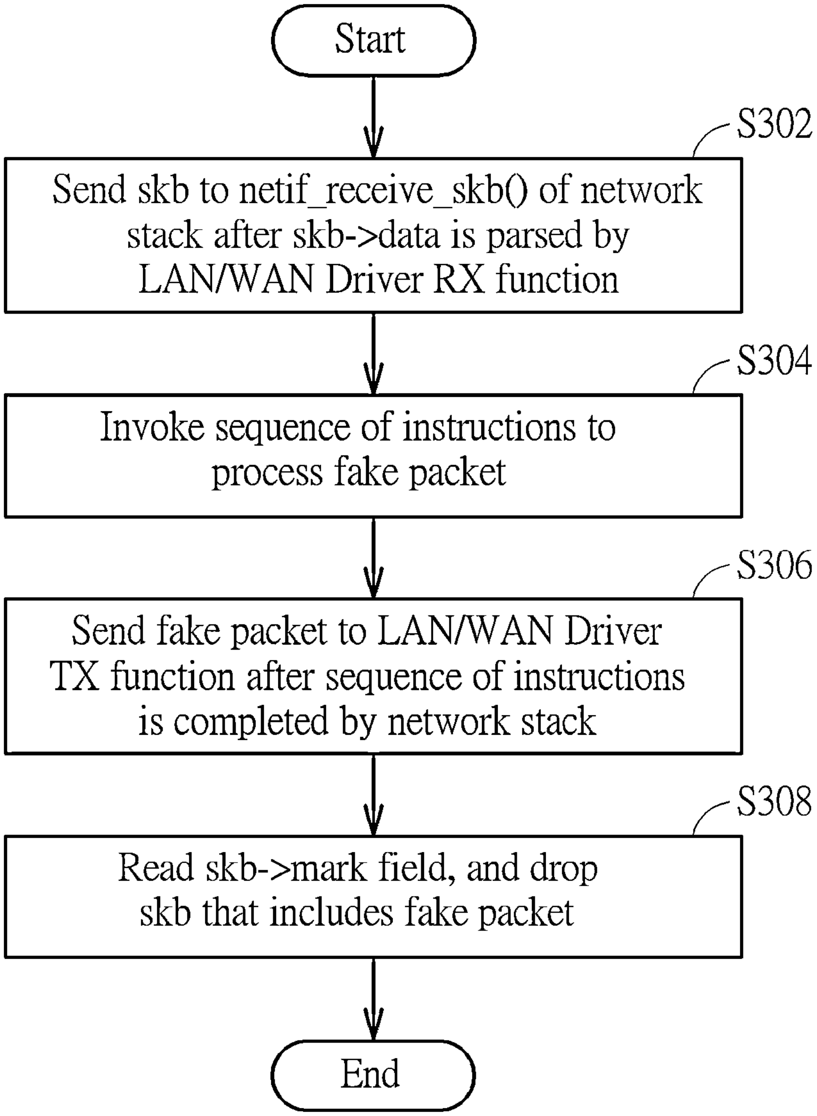
FIG. 3 is a flowchart illustrating a method of processing a fake packet according to an embodiment of the present invention.

FIG. 3 is a flowchart illustrating a method of processing the fake packet PKT_FK according to an embodiment of the present invention. The method may be performed by the processor 102 shown in FIG. 1. Provided that the result is substantially the same, the steps are not required to be executed in the exact order shown in FIG. 3. At step S302, the RX function of the LAN/WAN driver 120 sends the socket buffer skb to the netif_receive_skb( ) function of the network stack (e.g., Linux kernel network stack) 118 after parsing skb→data (i.e., fake packet PKT_FK). At step S304, the network stack (e.g., Linux kernel network stack) 118 performs further processing of the fake packet PKT_FK though invoking a sequence of instructions, including eth_type_trans( )→ip_rcv( )→ip_route_input_noref( )→ip_forward( )→ip_route_output( )→ip_output( )→dev_queue_xmit( ). The sequence of instructions invoked for processing the fake packet PKT_FK may be the same as a sequence of instructions invoked for processing a learning packet (i.e., a packet received by the network interface 106 and is sent to the network stack 118 without being directly forwarded by the frame engine 104). At step S306, the network stack (e.g., Linux kernel network stack) 118 sends the fake packet PKT_FK to the TX function of the LAN/WAN driver 120 after the aforementioned sequence of instructions is completed. At step 308, the TX function of the LAN/WAN driver 120 reads the skb→mark field which is indicative of a fake packet, and drops the socket buffer sbk without sending the fake packet PKT_FK to the network interface (e.g., WAN interface or LAN interface) 108. Hence, the fake packet PKT_FK is delivered internally without leaving the processor 102, and is used to make frequently-used instructions and data of learning packet processing kept in the cache 112 for facilitating learning packet processing of future learning packets.

It should be noted that these instructions mentioned above are for illustrative purposes only, and are not meant to be limitations of the present invention. For example, instructions involved in processing an IPv4 packet are not necessarily the same as that involved in processing an IPv6 packet. To put it simply, the present invention has no limitations on the instructions used for packet processing, and any network processor that loads and executes the proposed packet pre-learning module 122 for fake packet generation falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network processor comprising:

a processor, comprising:

at least one processor core, arranged to load and execute program codes to deal with packet processing, wherein the program codes comprise:

a network driver;

a network stack of an operating system (OS) kernel; and a packet pre-learning module, arranged to generate a fake packet, and send the fake packet to the network stack of the OS kernel through the network driver, wherein the fake packet is internally generated by one core of the at least one processor core(s), and is internally delivered by the one core of the at least one processor core(s) without leaving the one core of the at least one processor core(s); and a cache, arranged to cache at least a portion of instructions and data associated with processing of the fake packet that is performed by the network stack of the OS kernel.

2. The network processor of claim 1, wherein the packet pre-learning module is arrange to generate the fake packet periodically.

3. The network processor of claim 1, wherein the network stack of the OS kernel is arranged to send the fake packet to the network driver after processing the fake packet, and the network driver is arranged to drop the fake packet after receiving the fake packet from the network stack of the OS kernel.

4. The network processor of claim 1, further comprising:

a network interface, arranged to receive a packet from a network before the fake packet is generated;

wherein a configuration of the fake packet is based at least partly on the packet.

5. The network processor of claim 4, wherein the network interface is a local area network (LAN) interface.

6. The network processor of claim 4, wherein the network interface is a wide area network (WAN) interface.

7. The network processor of claim 1, further comprising:

a network interface, arranged to receive a packet from a network after the fake packet is generated, and send the packet to the network stack of the OS kernel through the network driver;

wherein a sequence of instructions invoked by the network stack of the OS kernel for processing the packet received by the network interface is identical to a sequence of instructions invoked by the network stack of the OS kernel for processing the fake packet generated by the packet pre-learning module.

8. The network processor of claim 7, wherein the network interface is a local area network (LAN) interface.

9. The network processor of claim 7, wherein the network interface is a wide area network (WAN) interface.

10. A packet processing method comprising:

executing a network driver;

executing a network stack of an operating system (OS) kernel;

generating a fake packet, and sending the fake packet to the network stack of the OS kernel through the network driver, wherein the fake packet is internally generated by one core of at least one processor core(s), and is internally delivered by the one core of the at least one processor core(s) without leaving the one core of the at least one processor core(s); and caching at least a portion of instructions and data associated with processing of the fake packet that is performed by the network stack of the OS kernel.

11. The packet processing method of claim 10, wherein generating the fake packet comprises:

generating the fake packet periodically.

12. The packet processing method of claim 10, wherein executing the network stack of the OS kernel comprises:

sending the fake packet to the network driver after processing the fake packet;

executing the network driver comprises:

dropping the fake packet after receiving the fake packet from the network stack of the OS kernel.

13. The packet processing method of claim 10, further comprising:

receiving a packet from a network interface before the fake packet is generated;

wherein a configuration of the fake packet is based at least partly on the packet.

14. The packet processing method of claim 13, wherein the network interface is a local area network (LAN) interface.

15. The packet processing method of claim 13, wherein the network interface is a wide area network (WAN) interface.

16. The packet processing method of claim 10, further comprising:

receiving a packet from the network interface after the fake packet is generated; and sending the packet to the network stack of the OS kernel through the network driver;

wherein a sequence of instructions invoked by the network stack of the OS kernel for processing the packet received from the network interface is identical to a sequence of instructions invoked by the network stack of the OS kernel for processing the fake packet.

17. The packet processing method of claim 16, wherein the network interface is a local area network (LAN) interface.

18. The packet processing method of claim 16, wherein the network interface is a wide area network (WAN) interface.

* * * * *